(No Model.)
D. HINES.
FENDER OR SAFETY ATTACHMENT FOR ELECTRIC OR OTHER CARS.
No. 450,460. Patented Apr. 14, 1891.
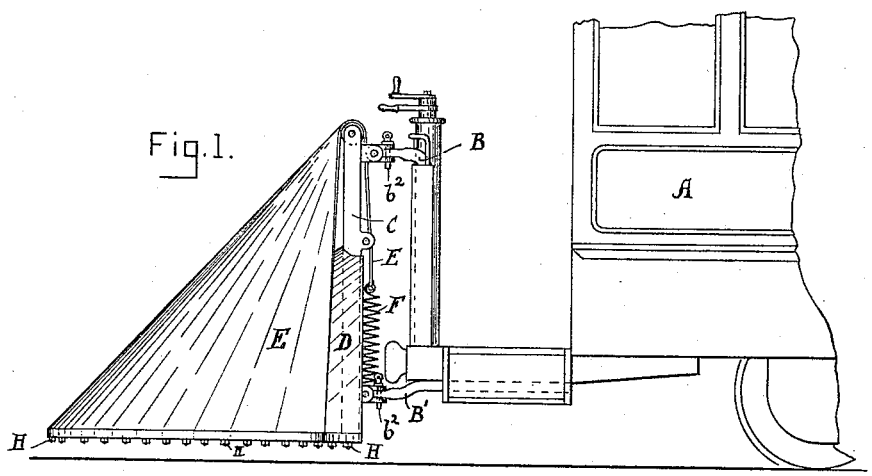
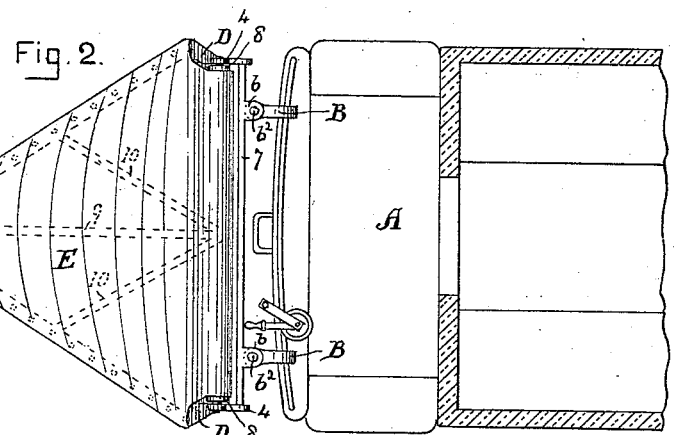
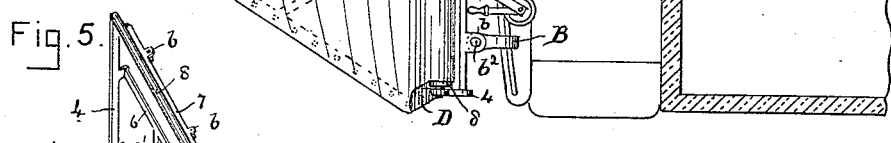
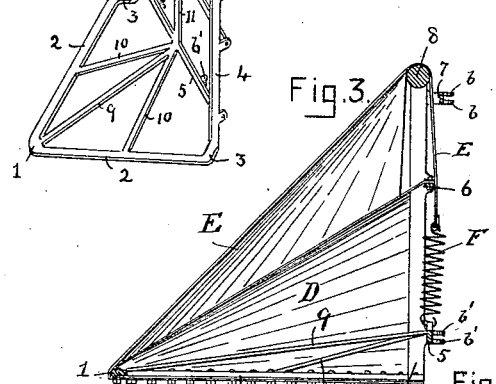
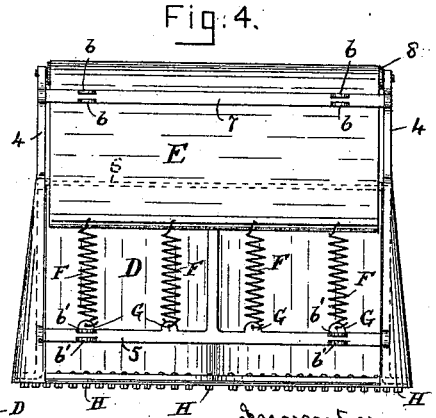

UNITED STATES PATENT OFFICE.

DAVID HINES, OF CAMBRIDGE, ASSIGNOR OF TWO-THIRDS TO EDWARD DE LA GRANJA AND JOHN HILLIS, BOTH OF BOSTON, MASSACHUSETTS.

FENDER OR SAFETY ATTACHMENT FOR ELECTRIC OR OTHER CARS.

SPECIFICATION forming part of Letters Patent No. 450,460, dated April 14, 1891.

Application filed June 23, 1890. Renewed March 12, 1891. Serial No. 384,718. (No model.)

*To all whom it may concern:*

Be it known that I, DAVID HINES, a citizen of the United States, residing at Cambridge, in the county of Middlesex and State of Massachusetts, have invented certain new and useful Improvements in Fenders or Safety Attachments for Electric or other Cars, of which the following, taken in connection with the accompanying drawings, is a specification.

The object of my invention is to produce a fender or safety attachment for electric and other cars whereby all danger of serious injury to persons or other objects that may be on the track upon which the car is running will be prevented.

The invention consists of a metallic frame covered with two sheets of canvas or other suitable material, the under sheet being stretched upon the frame and a space being left between the lower and upper sheet, which latter is connected to springs, so as to yield when an object is struck, as hereinafter fully described, and pointed out in the claims.

Referring to the accompanying drawings, Figure 1 represents a portion of one end of a car fitted with a fender or safety attachment embodying my invention. Fig. 2 is a plan or top view of the same. Fig. 3 is a vertical section taken through the center of the fender or safety attachment. Fig. 4 is a rear view. Fig. 5 is a perspective view of the frame, and Fig. 6 is a detail view.

A represents a portion of a car, to the platform of which is secured two standards B, bent over at their upper ends, as shown, and underneath the platform are secured two corresponding bars B'. These bars are flattened at their outer ends, which are each provided with a hole to receive a pin $b^2$.

C is a frame, preferably of flat bar-iron bent to the form shown—that is, with a rounded point 1, from which it extends backward in two horizontal lines 2 at or about an angle of ninety degrees. Then each end 3 is bent inward for a short distance at an angle of about ninety degrees. The bar then extends vertically to form side frames 4. To the rear of the side frames 4 are secured three cross-bars 5 6 7, and the upper end is fitted with a roller 8. A central stay 9 extends from the lower bar 5 to the point 1, and side stays 10 also extend from the bar 5 to the sides 2, and a bar 11 extends from the center of the bar 5 to the bar 6. It will be seen that by this construction I obtain a frame that is of a rectangular form vertically and of a triangular form horizontally, all the parts being securely braced together. The cross-bars 5 and 7 are provided with furcated lugs or ears $b\ b'$, that fit over the ends of the bars B B', and are provided with holes corresponding to the holes in said bars for the pins $b^2$ to pass through to secure the frame in place in front of the car.

D is a piece of stout canvas or other suitable material permanently secured to the frame over the point 1, sides 2, 3, and 4 as high as the middle bar 6, to which it is also secured. E is another piece of stout canvas or other suitable material permanently secured at its lower end over the point 1 and side 2, its upper end passing over the roller 8 and down the back, the end being provided with a metal bar, over which passes the upper end of a series of spiral springs F, the lower ends of which are connected to lugs G, formed on the bar 5. I prefer to secure the canvas to the frame by means of bolts and nuts H, and to prevent it from tearing out I place a strip of metal J over the canvas, as shown in Fig. 6.

The fender can be easily detached from one end of the car by simply removing the pins $b^2$ and carried to the other end, where it can be as readily attached.

When in use, should the fender strike a person he would come in contact with the canvas E, which would yield by reason of the spiral springs F, thus breaking the force of the blow and preventing serious injury, after which the spiral springs will draw the canvas to its normal taut condition. The canvas D will prevent the canvas E from yielding beyond the required distance as well as give additional strength for removing the person or other object from the track.

Although I have shown and described spiral springs for holding the rear end of the canvas E, any other suitable springs or spring might be employed, and although I have described the fender as particularly applicable to electric cars it is equally applicable to all cars not drawn by horses.

What I claim as my invention is—

1. A fender or safety attachment for electric and other cars, consisting of a light metal frame and a covering of canvas or other suitable material secured to the frame at its lower end and the upper end passing over a roller and secured to springs at the back of the frame, substantially as set forth.

2. A fender or safety attachment for electric and other cars, consisting of a light metal frame having an under covering of canvas rigidly secured thereto and an outer covering of canvas secured at its lower end to the frame and the upper end passing over a roller and secured to spiral or other springs, substantially as set forth.

3. The frame C, roller 8, canvas D and E, and spiral springs F, in combination with the standards B, bars B', secured to the car, and the pins $b^2$, substantially as shown and described.

In testimony whereof I have signed my name to this specification, in the presence of two subscribing witnesses, on this 18th day of June, A. D. 1890.

DAVID HINES.

Witnesses:
WM. W. BURRAGE,
EDWIN PLANTA.